(No Model.) 3 Sheets—Sheet 1.

F. C. DAMM.
MACHINE FOR MOLDING PLASTIC MATERIAL.

No. 422,186. Patented Feb. 25, 1890.

WITNESSES.
Frank Miller
W. J. Bainbridge

INVENTOR
Frederick C. Damm
By his attorneys
Watson & Thurston (No Model.) 3 Sheets—Sheet 3.

F. C. DAMM.
MACHINE FOR MOLDING PLASTIC MATERIAL.

No. 422,186. Patented Feb. 25, 1890.

WITNESSES: Frank Miller. W. J. Bambridge

INVENTOR. Fredrick C. Damm By his attorneys Watson + Thurston

UNITED STATES PATENT OFFICE.

FREDRICK C. DAMM, OF CLEVELAND, OHIO.

MACHINE FOR MOLDING PLASTIC MATERIAL.

SPECIFICATION forming part of Letters Patent No. 422,186, dated February 25, 1890.

Application filed May 8, 1889. Serial No. 310,004. (No model.)

*To all whom it may concern:*

Be it known that I, FREDRICK C. DAMM, a citizen of the United States, residing at Cleveland, in the county of Cuyahoga and State of Ohio, have invented certain new and useful Improvements in Machines for Molding Plastic Material, of which the following is a full, clear, and exact description, reference being had to the accompanying drawings.

My invention relates to that class of machines which are particularly adapted to pressing into the desired shape such plastic compositions as are now most extensively used in the manufacture of what are known as "flying targets." The compositions used most generally are such as are made plastic by heat and which harden when cooled.

The object of my invention is to provide a machine having greater capacity and durability than prior machines, and which shall be as near automatic in its action as practicable. To this end it consists in the construction, combination, and arrangement of parts herein described and shown, and pointed out definitely in the claims.

Figure 1:
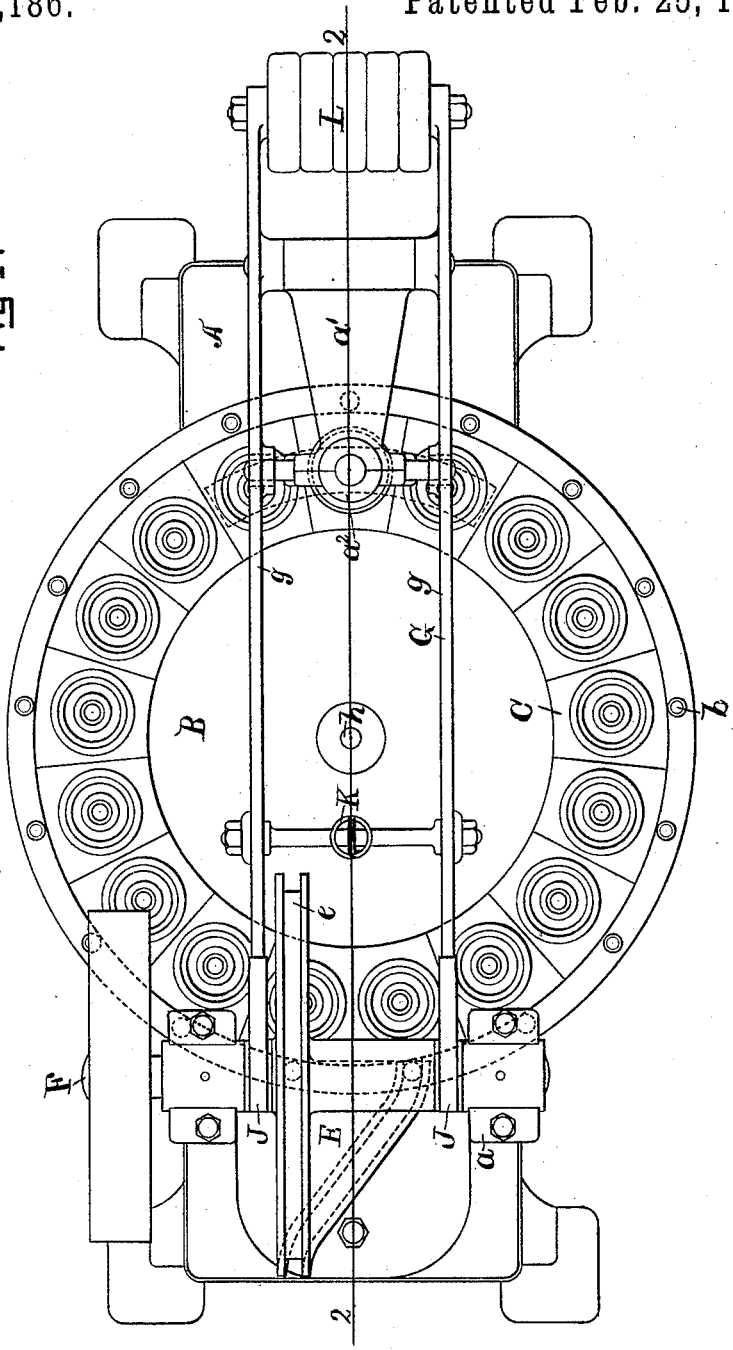
Figure 2:
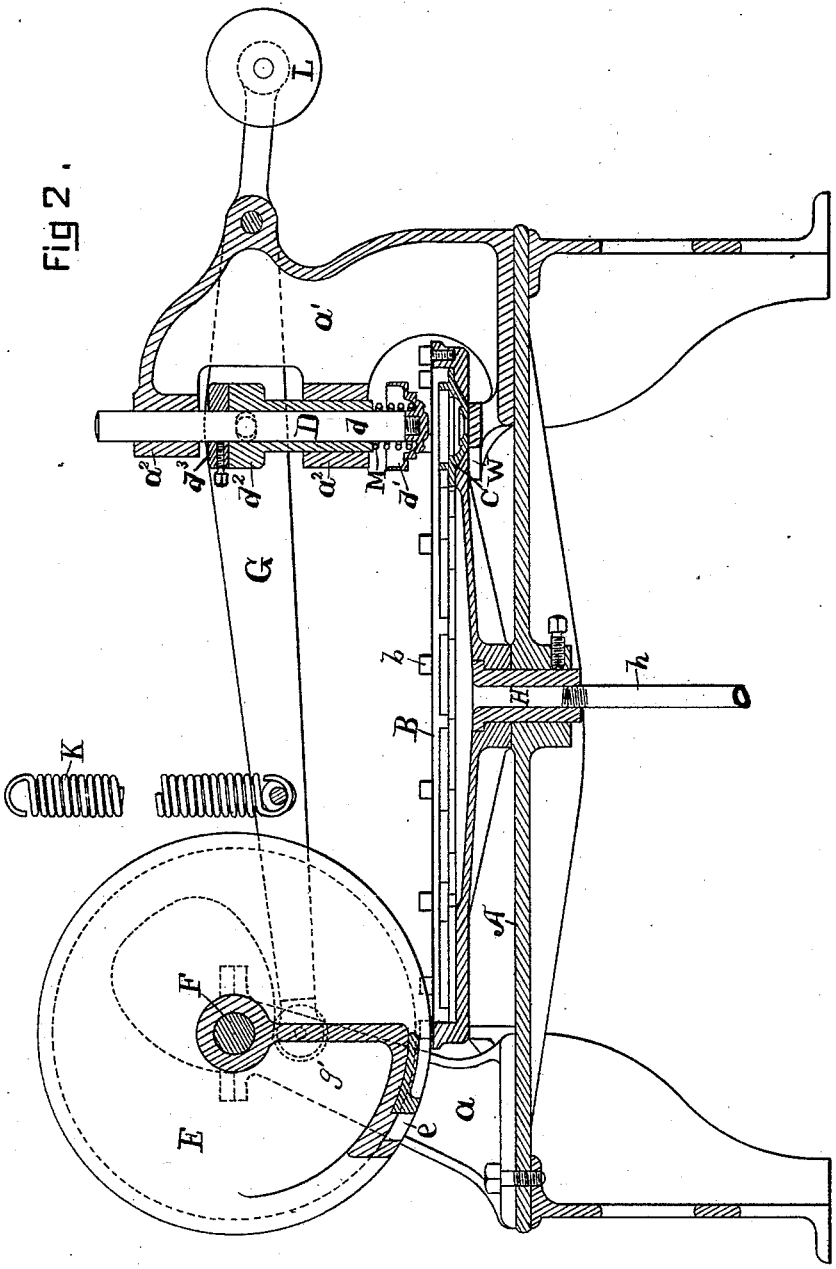
Figure 3:
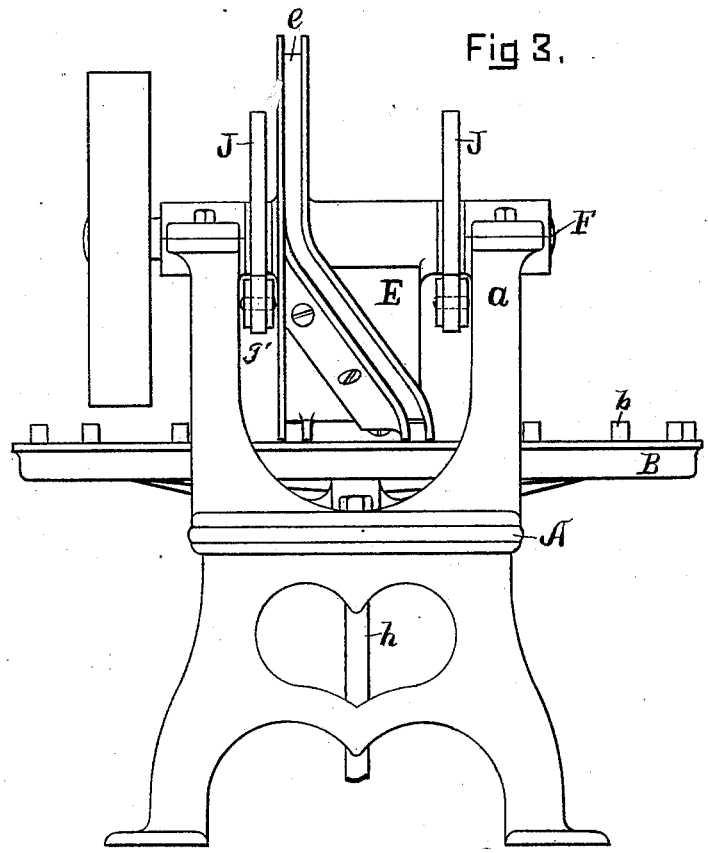
Figure 4:
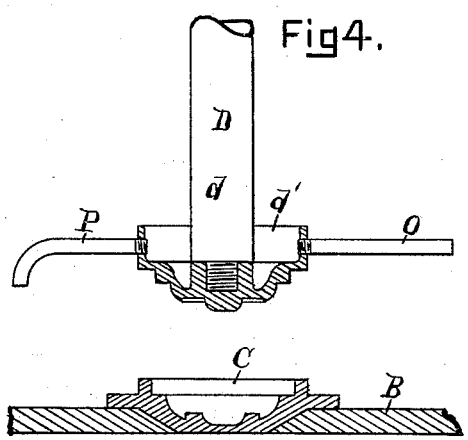

Referring to the drawings, Figure 1 is a plan view of my improved machine. Fig. 2 is a central vertical sectional view on line 2 2 of Fig. 1. Fig. 3 is an end elevation; and Fig. 4 is a detail view of the plunger, die, &c.

I will now proceed to describe the embodiment of my invention illustrated in the drawings, which is particularly adapted for making flying targets.

Referring to the drawings, A represents the frame, which may be of any suitable form.

B represents a revoluble horizontal wheel centrally journaled to the frame by the arbor H. This wheel, in the form shown, is solid, and the middle part thereof is concave upon its upper side and has its lowest point in the center. A drip-pipe $h$ connects with the hollow arbor H, upon which the wheel is journaled, and serves to drain off the water which may be spilled on the wheel during the operation of the machine.

On the upper surface of the wheel B, and near the edge thereof, a series of molds C of the proper form are arranged at regular intervals. From the upper surface of said wheel B there projects as many vertical pins $b$ as there are molds, which pins form a rack and are arranged in such manner that they will engage at the proper time with the cam-wheel E.

F represents a shaft, which is journaled in the standards $a$ at one end of the frame. Secured to this shaft is a cam-wheel E, in the edge of which is formed a cam-groove $e$. This groove extends preferably for about three-fourths of the distance around the wheel in a plane perpendicular to the axis of revolution. Then it passes spirally or diagonally across the face of the wheel, this spiral portion occupying preferably about one-quarter of the circumference. Then it continues a very short distance in a plane perpendicular to the axis of revolution, and, in the best construction, ends at a point just beyond the radial plane in which the groove begins. The distance between the parallel parts of this groove is equal to the distance on a straight line between two successive pins $b$. At the opposite end of the frame the standard $a'$ is provided with guides $a^2$, which guide the vertical movements of the reciprocating plunger D. A bifurcated lever G is pivoted to the standard $a'$ and engages with the plunger D, whereby the rocking of the lever moves the plunger up and down. In the form shown the plunger consists of a rod $d$, having a hollow die $d'$ secured to its lower end. This rod is surrounded by a loose sleeve $d^2$, from the sides of which project two pins which enter slots in the arms $g$ $g$ of the lever G. Above this sleeve $d^2$ a collar $d^3$ is secured to the rod $d$ by means of a set-screw, whereby when the sleeve $d^2$ is moved upward by the rocking of the lever G it engages with the collar $d^3$, and the plunger is thereby moved upward. Between the lower end of the sleeve and the die a stiff coiled spring M is introduced, which thrusts at its ends, respectively, against said die and the lower end of said sleeve, whereby when the lever G moves the sleeve $d^2$ downward it presses against the coiled spring M, and the die is thereby moved downward under a strong spring-pressure. Except in the claims, where it is specifically mentioned, this specific construction of the plunger is not a material part of the invention.

The die is hollow, and water is kept constantly flowing into the same through the pipe O and flowing out through the pipe P, from which it is discharged into the mold containing the last-formed target, whereby the same is quickly cooled and set.

Rigidly secured to the shaft F are two cams J J, which engage with the friction-rollers $g'$ $g'$ on the arms $g$ $g$ of the lever G and in their revolution force these arms of the lever downward, and then permit a spring K or a weight L on the rear end of the lever, or both, to draw it back.

W represents a supporting-track, which is secured to the frame A beneath the wheel B, and said wheel rests during a part of its revolution, and particularly at the point beneath the plunger, upon this track, whereby the disk and its pivot are prevented from being bent by the downward pressure of said plunger.

In the form of the invention shown in Fig. 2 the molds attached to the wheel are provided with a hole through their bottoms. This hole is closed by the track W so long as the wheel rests thereon, whereby none of the plastic material which is introduced into said molds may either run through the holes or be forced through them by the action of the plunger. When the wheel in its revolution passes beyond the end of said track W, these holes permit the water which has been used in cooling the molded article, and which will fall into the mold when said article is being removed in spite of the most careful handling, to drain off. The molds, however, may be made without these holes, as shown in Fig. 4, in which case the water has to be wiped or sponged out.

In Fig. 2 the parts of the machine are shown in position where the plunger is just about to be forced downward to form one of the targets. One of the pins $b$ has just engaged with the slot $e$ and the other pin is about to be disengaged therefrom. By having one end of the groove $e$ extend past the other end the wheel B is prevented from being moved accidentally or otherwise by any agency except the cam-groove, because one end of said groove holds the wheel firmly in position by its engagement with one pin until the other end of the groove has become engaged with the next pin. The wheel B being thus held stationary with one of the molds beneath the plunger, the cams J J in revolving force down the two ends of the lever G, and thereby force the plunger down into the mold, whereby the target is formed. As the cams J J continue to revolve, the spring K or other means provided moves the arms of the lever G upward and withdraws the plunger. By this time the spiral part of the groove $e$ has been revolved until it engages with the pin, and its continued revolution moves the wheel the distance between two successive molds, and the machine will again be in the position shown in Fig. 2. The means shown and described for moving the wheel B and holding it while the material is being pressed into shape in the molds permits the machine to be operated rapidly without any danger that the sudden stopping of the wheel B will so jar the machine as to rapidly wear it out.

Having thus described my invention, what I claim as new, and desire to secure by Letters Patent, is—

1. In a machine for molding plastic material, the combination of a horizontal revoluble wheel having molds C arranged upon its upper side, and a rack, with a reciprocating plunger and revolving wheel having a cam-groove upon its edge adapted to engage with said rack, substantially as and for the purpose specified.

2. In a machine for molding plastic material, the combination of a horizontal revoluble wheel having the molds C and pins $b$, forming a rack upon its upper side, and a reciprocating plunger, with a revolving cam-wheel having a groove $e$ in its edge, which groove consists of a long straight part, a diagonal part, and a short straight part, which extends around the wheel to a point slightly beyond the radial plane in which said groove begins, whereby the groove remains in engagement with one pin until it is engaged with the next succeeding pin, substantially as and for the purpose specified.

3. In a machine for molding plastic material, the combination of a horizontal revoluble wheel bearing a series of molds, and mechanism for moving said wheel to bring the molds successively beneath a plunger, with a vertically-reciprocating plunger, a lever engaging with said plunger, and a revolving cam for operating said lever, substantially as and for the purpose specified.

4. In a machine for molding plastic material, the combination of a horizontal revoluble wheel bearing a series of molds, and mechanism for bringing said molds successively beneath a plunger, with a vertically-movable rod having a die on its lower end, a sleeve surrounding said rod, a collar secured to said rod above said sleeve, a coiled spring, and a rocking lever, substantially as and for the purpose specified.

5. In a machine for molding plastic material, the combination of a horizontal revoluble wheel bearing the molds C and pins $b$, a bifurcated lever G, and a vertically-movable plunger which engages with said lever, with a revolving shaft having secured thereto the cams J J and a cam-wheel E, substantially as and for the purpose specified.

6. In a machine for molding plastic material, the combination of a solid horizontal revoluble wheel having a concave top, and molds secured to said wheel, with a reciprocating hollow die having the pipes O and P connected therewith, whereby water is permitted to flow into said die and to be discharged from the same into the molds, and a drip-pipe which connects with the hollow arbor upon which said wheel is journaled, substantially as and for the purpose specified.

7. In a machine for molding plastic material, the combination of a horizontal revoluble wheel and molds secured at intervals to the upper side thereof, said molds being provided with holes which extend through their bottoms and through the wheel, and mechanism for revolving said wheel intermittently, with a reciprocating hollow die having the pipes O and P connected therewith, whereby water is permitted to flow into said die and to be discharged therefrom into the molds, and a track upon which that part of the wheel beneath the plunger rests, substantially as and for the purpose specified.

FREDRICK C. DAMM.

Witnesses:
E. L. THURSTON,
FRANK MILLER.